(12) United States Patent
Brownell et al.

(10) Patent No.: US 7,225,330 B2
(45) Date of Patent: May 29, 2007

(54) SECURITY MECHANISM FOR COMPUTER PROCESSING MODULES

(75) Inventors: Jason S. Brownell, San Francisco, CA (US); Steven T. Ansell, Fremont, CA (US); Perry T. Devine, Brookings, OR (US); Earl Levine, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/107,103

(22) Filed: Apr. 14, 2005

(65) Prior Publication Data

US 2005/0246524 A1 Nov. 3, 2005

Related U.S. Application Data

(63) Continuation of application No. 09/773,256, filed on Jan. 30, 2001, now Pat. No. 6,965,994.

(51) Int. Cl.
*H04L 29/00* (2006.01)
(52) U.S. Cl. ......................................... 713/156; 726/10
(58) Field of Classification Search ................ 713/156, 713/10
See application file for complete search history.

(56) References Cited

U.S. PATENT DOCUMENTS

| | | | | |
|---|---|---|---|---|
| 5,418,713 | A | 5/1995 | Allen | 361/403 |
| 5,636,276 | A | 6/1997 | Bragger | 380/4 |
| 5,734,823 | A | 3/1998 | Saigh et al. | 395/200.06 |
| 5,734,891 | A | 3/1998 | Saigh | 395/610 |
| 5,794,217 | A | 8/1998 | Allen | 705/27 |
| 5,991,399 | A * | 11/1999 | Graunke et al. | 380/279 |
| 6,088,450 | A * | 7/2000 | Davis et al. | 713/182 |
| 6,105,137 | A * | 8/2000 | Graunke et al. | 713/201 |
| 6,138,235 | A * | 10/2000 | Lipkin et al. | 713/155 |
| 6,301,658 | B1 * | 10/2001 | Koehler | 713/155 |
| 6,598,167 | B2 * | 7/2003 | Devine et al. | 713/201 |
| 6,615,350 | B1 * | 9/2003 | Schell et al. | 713/200 |

(Continued)

FOREIGN PATENT DOCUMENTS

WO          WO 98/07255          2/1998

OTHER PUBLICATIONS

Housley, R. et al., "Internet X.509 Public Key Infrastructure Certificate and CRL Profile", *Network Working Group Request For Comments*, Jan. 1999, 1-32, XP-002227696.

(Continued)

*Primary Examiner*—Kambiz Zand
(74) *Attorney, Agent, or Firm*—Woodcock Washburn LLP

(57) ABSTRACT

To provide improved security in adjunct program modules such as plug-ins and dynamic link libraries, a requesting module provides an authorization interface to the invoked module such that the invoked module can require a certificate of the requesting module and can also challenge the authority of the requesting module. The certificate can include one or more permissions which are prerequisites for processing by the invoked module.

The invoked module can challenge the authority of the requesting module by sending random test data to the requesting module and receiving in response a cryptographic signature of the test data. By verifying the signature of the requesting module using the received certificate, the invoked module confirms that the requesting module is, in fact, the owner of the receive certificate.

15 Claims, 11 Drawing Sheets

U.S. PATENT DOCUMENTS 6,754,829 B1 * 6/2004 Butt et al. .................. 713/200

OTHER PUBLICATIONS

Linn, J. et al., "Attribute Certification: An Enabling Technology for Delegation and Role-Based Controls in Distributed Environments", *Proceedings 4th . ACM Workshop on Role-Based Access Control*, Oct. 28-29, 1999, 121-130, XP-000958110.

Park, J.S. et al., "Smart Certificates: Extending X.509 for Secure Attribute Services on the Web", *National Information Systems Security Conference*, 1999, 22, 337-348, XP-002954616.

* cited by examiner

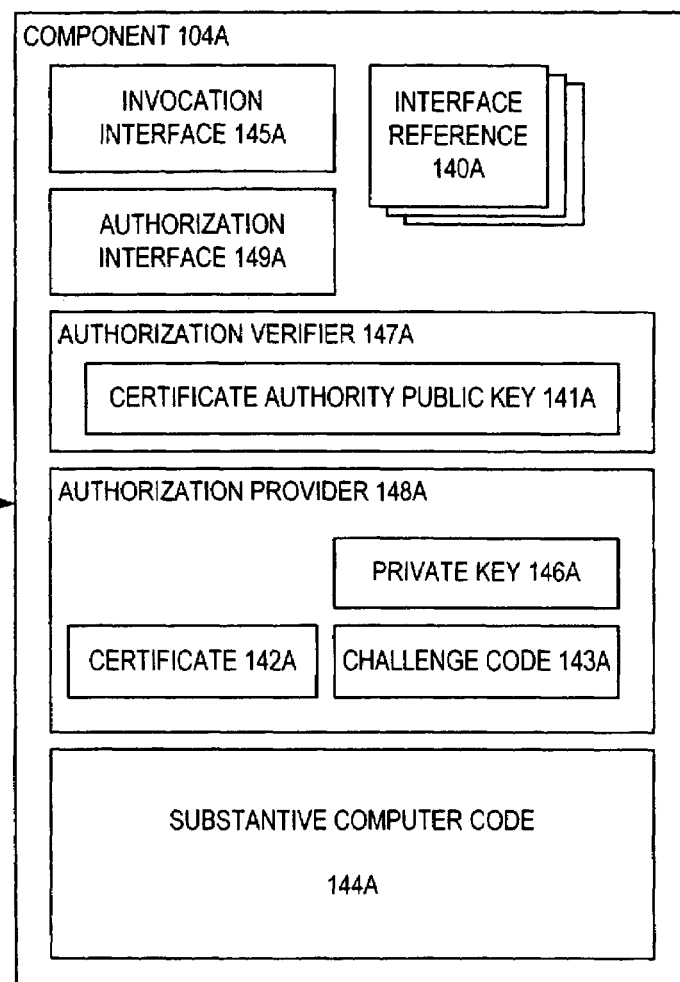

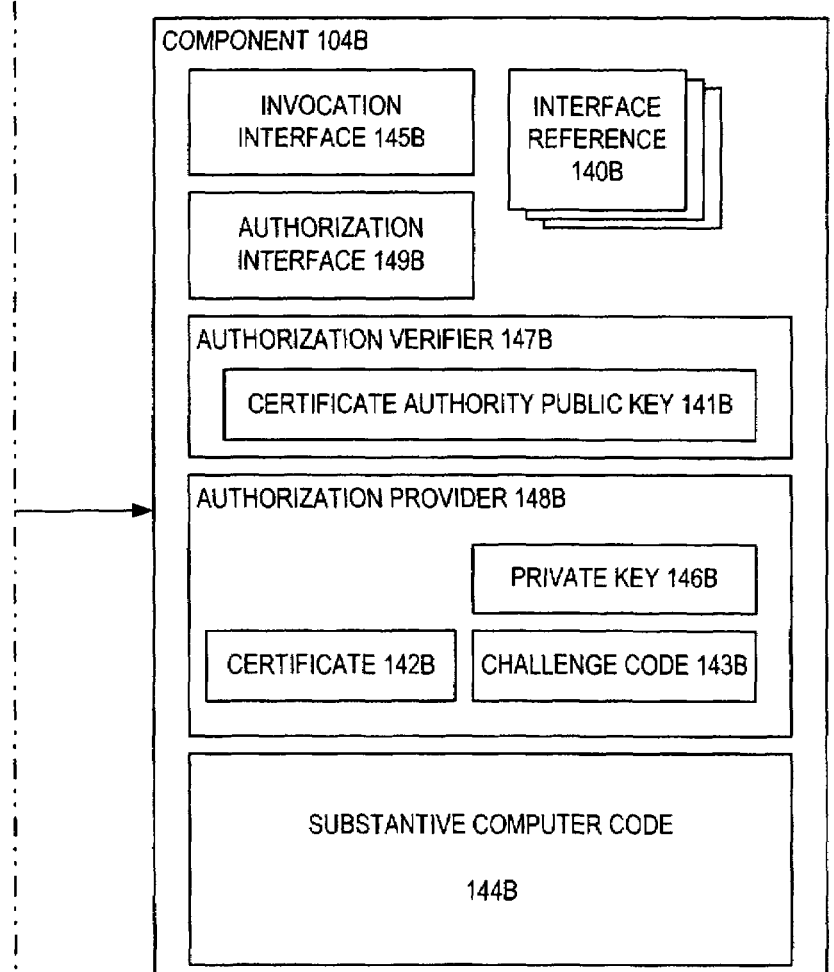
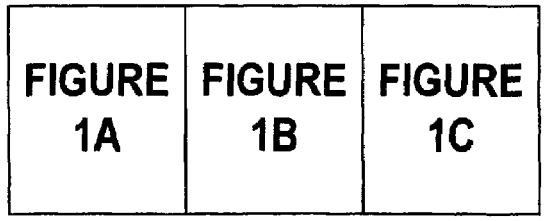

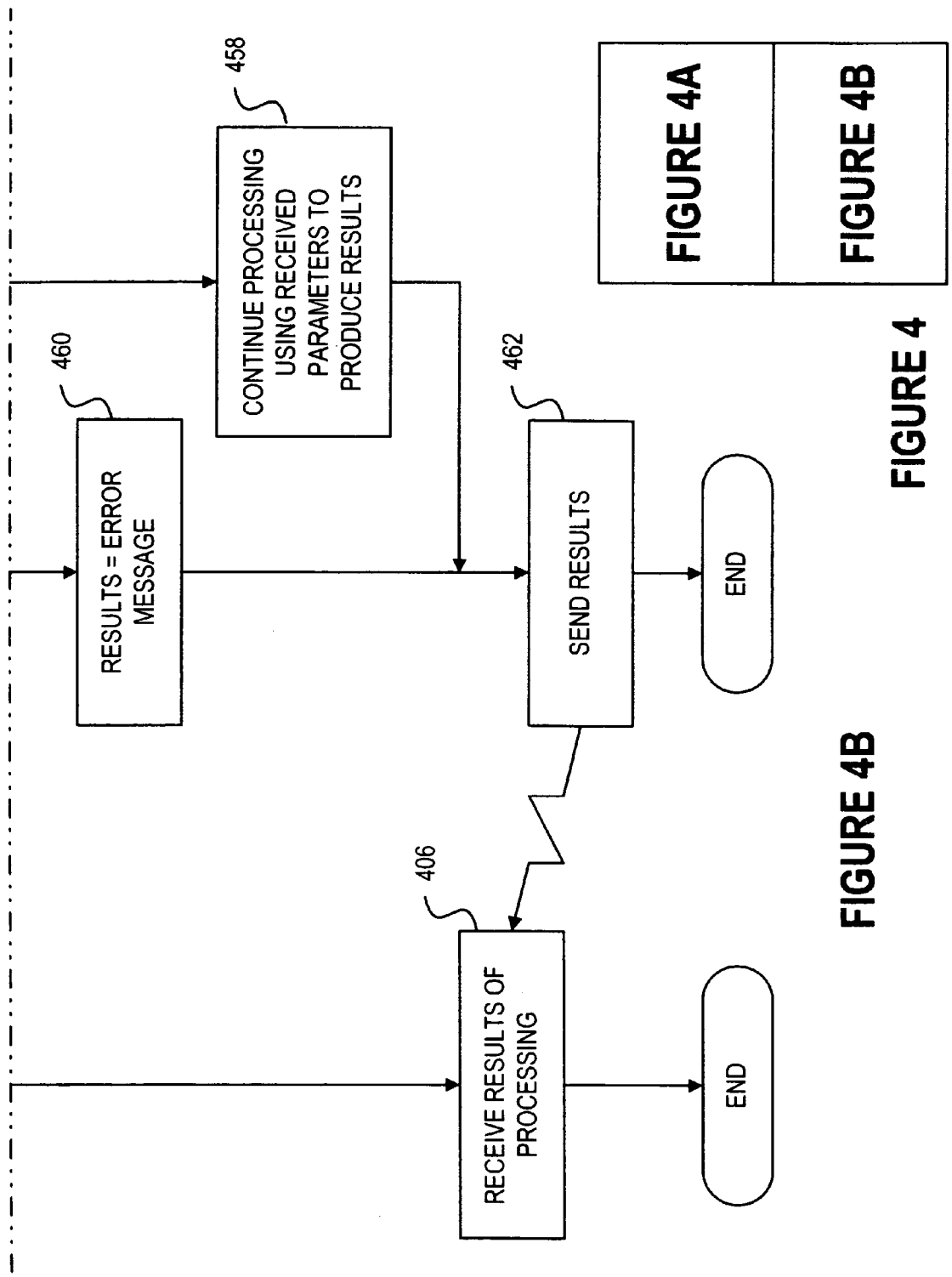

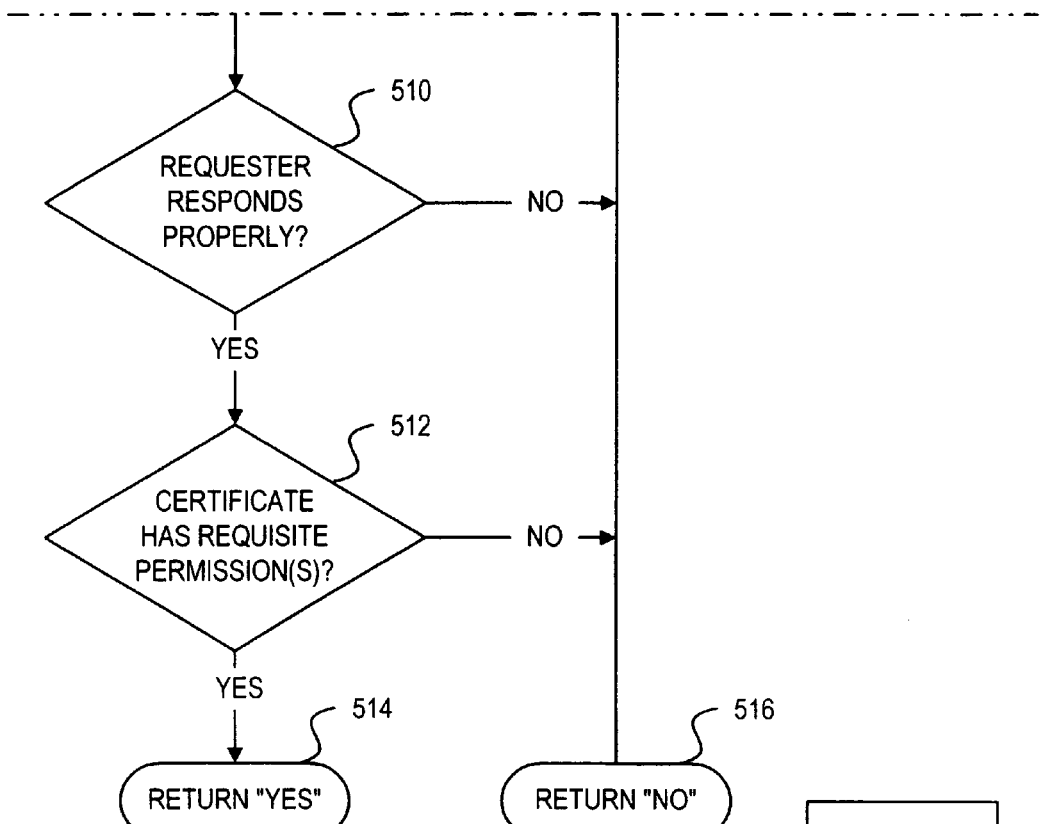

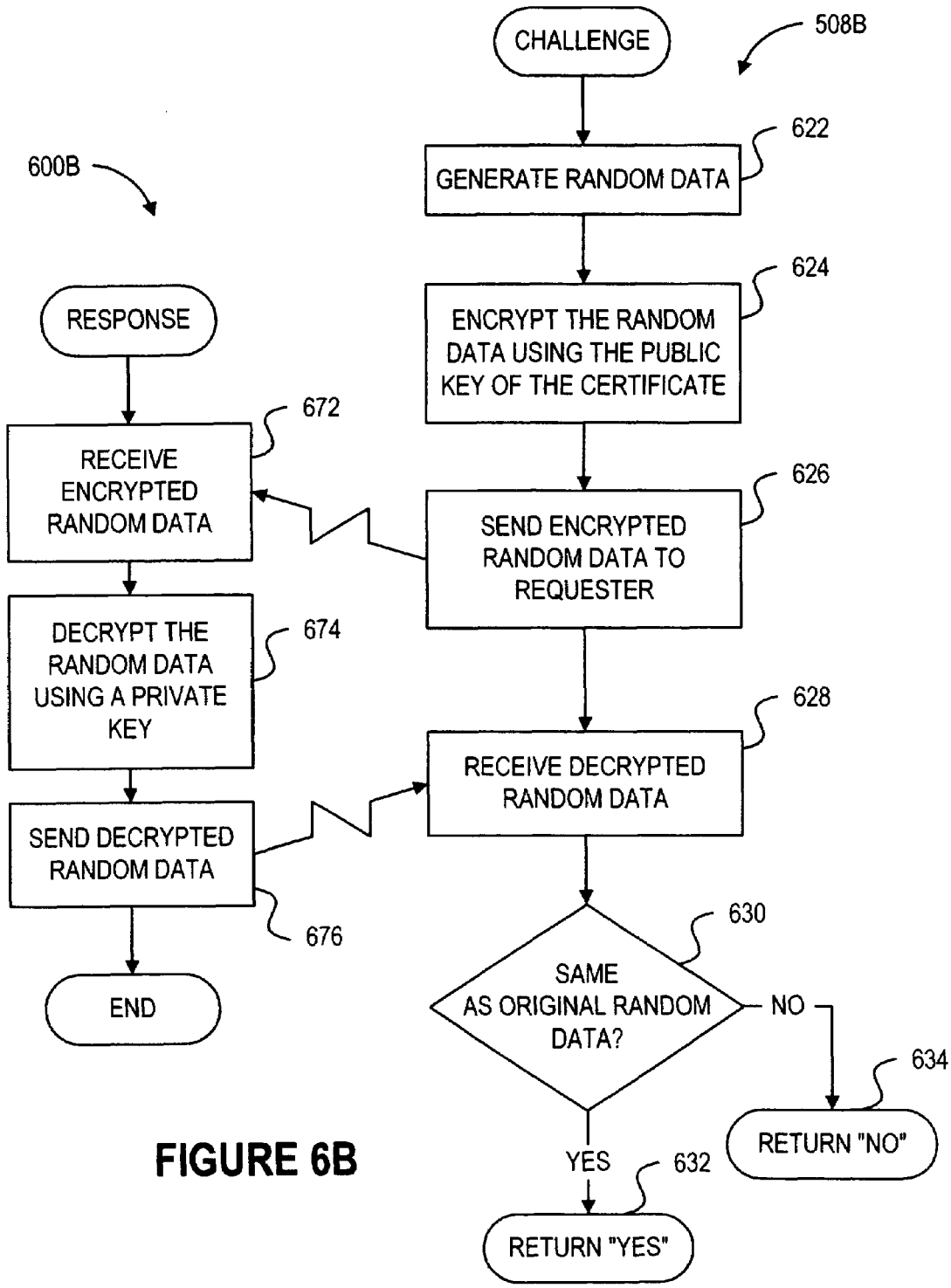

SECURITY MECHANISM FOR COMPUTER PROCESSING MODULES

RELATED APPLICATIONS

This application is a continuation of U.S. patent application Ser. No. 09/773,256, filed Jan. 30, 2001 now U.S. Pat. No. 6,965,994; which application is incorporated herein by reference.

BACKGROUND OF THE INVENTION

Computer programs are currently made extensible and efficient by the use of adjunct program modules such as plug-ins and dynamic link libraries. Plug-ins are computer program modules which can alter the behavior of a computer program without changing the computer program itself. A common example of plug-ins are those associated with currently ubiquitous web browsers. Briefly, a web browser is a computer program by which a user retrieves multimedia documents and information through that portion of the Internet known as the World Wide Web. Installation of plug-ins allow modification of the behavior of the web browser without re-installing or otherwise changing the computer instructions of the web browser itself. One example of such extended functionality is the embedded display of images of the Tagged Image File Format (TIFF). Such functionality is not provided by some web browsers currently, but installation of certain plug-ins add that functionality. To use the plug-in, applications such as web browsers are designed to look for installed plug-ins and, if installed, invoke execution of those plug-ins upon activation of a particular function or activity.

Plug-ins can sometimes be implemented as dynamic link libraries. Dynamic link libraries can be used for other purposes as well. A dynamic link library is a collection of program modules which are generally not loaded until invoked by another program. The following example will illustrate. Consider a web browser which provides a spell-checking capability for forms data entry. A web browser is typically a resource-intensive program such that a considerable amount of memory is used when the web browser is executing. A spell-checker can also be resource-intensive. By implementing the spell-checker as part of a dynamic link library, execution of the web browser does not immediately load the spell-checker into memory. Accordingly, the resources required for the spell-checker are not immediately consumed. Instead, the spell-checker is loaded for execution only when a user requests a spell checking function of the web browser. Such allows the web browser to execute more efficiently when the spell-check function is not invoked.

For reasons pertaining both to extensibility and efficiency, adjunct program modules such as plug-ins and modules of dynamic link libraries are quite popular. An additional factor in the popularity of such adjunct program modules is the simplicity with which they are implemented. To facilitate the use of adjunct processing modules, such modules are designed to be very easily identified and invoked. Virtually no safeguards are used to ensure only a specifically authorized computer program invokes execution of a particular adjunct program module.

The lack of security in adjunct program modules is a significant problem. The following example is illustrative. Consider that a computer user has collected a number of musical songs in the ubiquitous and renowned MP3 digital format and plays the songs on a computer using an MP3 player program. Consider further that the user has purchased and downloaded a number of songs in a secure, copy-protected format but wishes to play those songs along with the other songs in the MP3 format. The MP3 player program can be augmented with a plug-in adjunct program module to decode and play the secure, copy-protected format. Such an adjunct program module, when requested, can decode the secure, copy-protected music and produce un-secured, un-protected music for reproduction through the computer's sound logic and loudspeakers.

However, due to the accessibility of conventional adjunct program modules, any program could request decoding of the secure, copy-protected music data by the decoding adjunct program module. Accordingly, a cracker could write a simple program to request decoding from the adjunct program module and to re-write the decoded music in the MP3 format. The resulting MP3 music data file could have identical sound quality and could be distributed worldwide through the Internet without any encryption security or copy-protection. Such would represent a catastrophic failure of the secure, copy-protected format decoded by the adjunct program module.

What is therefore needed is a security mechanism by which adjunct program modules can limit service to authorized program modules. Such would enable security-reliant computer processes to avail themselves of the benefits and advantages of adjunct program modules.

SUMMARY OF THE INVENTION

In accordance with the present invention, an adjunct program module can require a certificate from a requesting program module to authenticate the requesting program module as authorized to request processing by the adjunct program module. The adjunct program module only performs requested processing when the certificate received from the requesting program module indicates that the requesting program module is authorized to request such processing. In this way, processing is not performed when requested by an unauthorized program module and security is significantly enhanced.

The interface of the adjunct program module indicates that the adjunct program module requires an authorization interface of the requesting program module. The authorization interfaces specifies the manner in which the invoked adjunct program module can request authorization. The use of an authorization interface allows increased flexibility in the implementation of authorization protocols according to the present invention. If the invoked adjunct program module requires a certificate for authentication, the invoked adjunct program module requests, and receives, the certificate from the requester using the requester's authorization interface.

There are a number of ways in which the certificate can be validated as indicating that the requesting program module is authorized to request such processing. The certificate is cryptographically signed by a certificate authority and verification of that signature ensures that no entity has tampered with the certificate, perhaps to alter the identity of the owner of the certificate or to add permissions to the certificate. Failure to validate the certificate authority's signature results in refusal to perform the requested processing.

The received certificate only authorizes processing by the owner of the certificate. The received certificate identifies its owner. If the program module requesting processing is not the owner of the certificate, the adjunct program module refuses to perform the requested processing. The owner's identity can be verified using a challenge-response protocol. In addition, the certificate expires at a predetermined time, and the adjunct program module refuses to perform the requested processing if the certificate has expired.

The certificate also includes a number of permissions. Each permission includes data which is associated with one or more types of actions which are authorized by the certificate. The adjunct program module can be configured to perform processing only when the received certificate includes a specific, predetermined permission. The use of permissions adds a significant degree of flexibility in the security protocol described herein. For example, a particular permission could grant its owner the authority to examine parts of a secure, copy-protected audio signal, such as the title and artist of the audio signal, without granting authority to the decoded, un-secured, un-protected audio data stream.

As mentioned above, the identity of the requester as the owner of the certificate can be challenged. Thus, stealing a certificate of, and masquerading as, an authorized requesting program module is insufficient. The challenge response mechanism according to the present invention verifies that the requesting module has access to a private key associated with the certificate.

To challenge the authority of the requesting module, the adjunct program module randomly produces test data and requires that the requester cryptographically processes the test data as a precondition to performing processing requested by the requester. The cryptographic processing by the requester involves asymmetric key encryption and use by the requester of the requester's private key. Requiring cryptographic use of the requester's private key establishes that the private key of the requester matches the public key of the requester's certificate and therefore confirms the requester's identity and authority.

Individually, each of these individual security mechanisms can be used by the adjunct program module to significantly deter unauthorized use of adjunct program modules. The described security mechanisms can also be combined to provide a tremendous deterrence to unauthorized use of adjunct program modules over conventional adjunct program module interfaces.

BRIEF DESCRIPTION OF THE DRAWINGS

FIGS. 6A-B are a logic flow diagrams of respective embodiments of a challenge-response authentication interface in accordance with the present invention.

DETAILED DESCRIPTION OF THE INVENTION

In accordance with the present invention, a security protocol is implemented between an application 102 (FIG. 1) and a component 104A and between component 104A and a component 104B. Components 104A-B are adjunct program modules which are loaded and executed separately from application 102 and from each other but execution of which can be requested for application 102 or other components. In this illustrative embodiment, components 104A-B are modules of one or more dynamic link libraries (DLLs). The very nature of adjunct program modules suggests that execution of adjunct program modules by other program modules is both easy and straight-forward. However, because of security protocols described herein, adjunct program modules can be used to perform tasks in which security is required.

Figure 2:
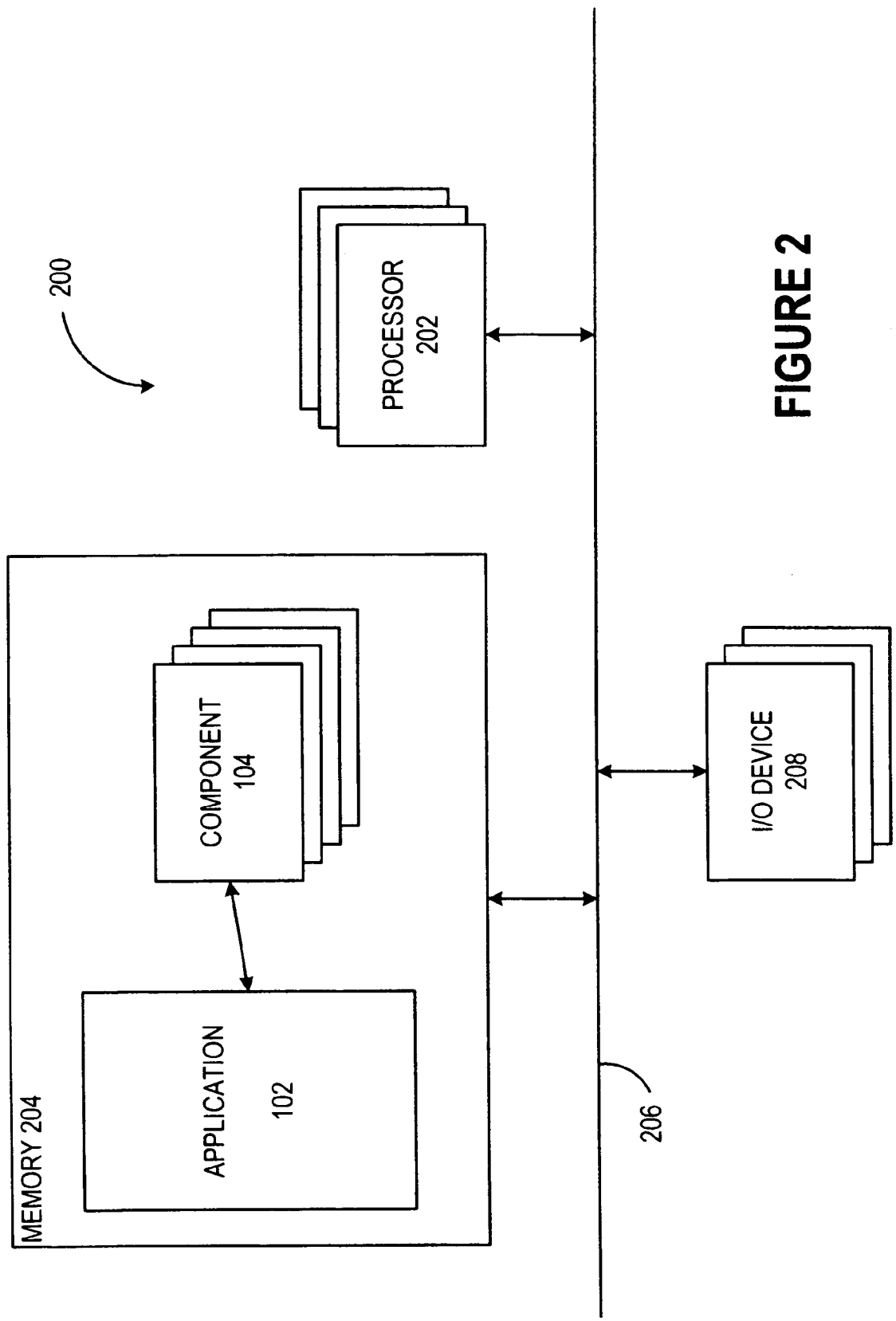
FIG. 2 is a block diagram of a computer system in which the application and adjunct program modules of FIG. 1 execute.

Application 102 and components 104A-B are each all or part of one or more computer processes executing within computer system 200 (FIG. 2). Computer system 200 includes one or more processors 202 and a memory 204 which can include randomly accessible memory (RAM) and read-only memory (ROM) and can include generally any storage medium such as magnetic and/or optical disks. Memory 204 and processors 202 interact with one another through an interconnect 206.

A user interacts with computer system 200 through one or more input/output (I/O) devices 208 which can include, for example, a keyboard, an electronic mouse, trackball, tablet or similar locator device, an optical scanner, a printer, a CRT or LCD monitor, a sound card, a microphone, one or more loudspeakers, and/or a network access device through which computer system 200 can be connected to a computer network. To facilitate understanding of the inter-operation of the elements of computer system 200 according to this illustrative embodiment, the illustrative example of playback of secured and copy-protected audio data is continued. Under control of a user, e.g., through physical manipulation of one or more of I/O devices 208, application 102 and components 104 collectively decode the secured, copy-protected audio data to produce raw audio data for playback through one or more of I/O devices 208 such as a sound card and loudspeakers. While computer system 200 is shown to be a single computer system, it is appreciated that application 102 and/or one or more of components 104 can be distributed over multiple computer systems which are interconnected to perform the functions described herein.

Figure 1A:
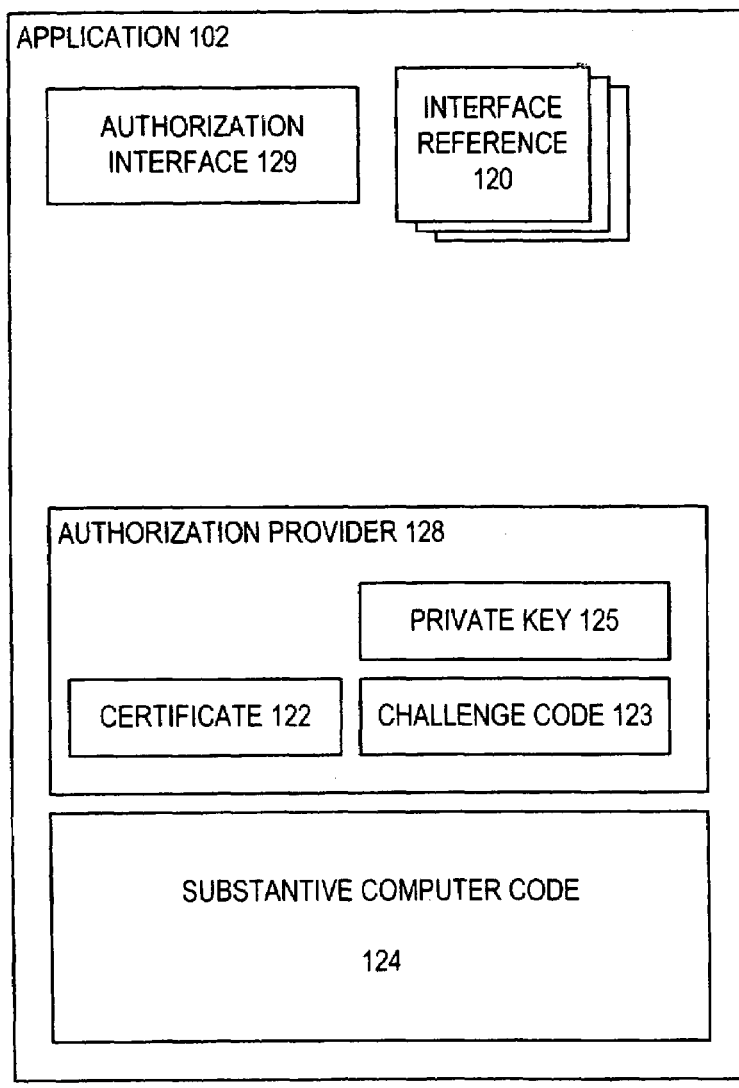
FIG. 1 is a block diagram of an application and two program modules which use certificates to authorize processing in accordance with the present invention.

Furthering the illustrative example of decoding, and playing, back secured, copy-protected audio data, such decoding is performed by one of components 104, e.g., component 104B (FIG. 1). To accomplish such decoding, application 102 requests execution of component 104A which in turn requests execution of component 104B. In this illustrative example, component 104A verifies authorization of the user to access the secured audio data prior to requesting decoding, of the secured audio data by component 104B. Since component 104B decodes secured audio data and returns the raw audio data in this illustrative example, it is desirable that component 104B ensures that such decoding is performed only for duly authorized requesters, e.g., component 104A and/or application 102.

As shown in FIG. 1, component 104B includes substantive computer code 144B which, in this illustrative example, decodes secured, copy-protected audio data and produces raw audio data when executed. Substantive computer code 144B includes computer instructions and data which collectively specify the behavior of component 104B. Component 104A includes substantive computer code 144A which is analogous to substantive computer code 144B of component 104B. Substantive computer code 124 of application 102 is also analogous to substantive computer code 144A-B. Of course, substantive computer code 124 and 144A can specify a different behavior than that specified by substantive computer code 144B.

Application 102 includes interface references 120, each of which identifies an interface which in turn specifies a manner in which application 102 interacts with an adjunct program module such as component 104A. Component 104A includes an invocation interface 145A which specifies a manner in which execution of component 104A is invoked. To request processing by component 104A, application 102 must first acquire access to invocation interface 145A. Application 102 requests, and component 104A provides, a reference to invocation interface 145A which application 102 stores in interface references 120 and subsequently uses to request processing from component 104A.

Component 104A also includes one or more interface references 140A each of which identifies an interface which in turn specifies a manner by which component 104A can invoke execution of other components such as component 104B. Component 104B includes invocation interface 145B and interface references 140B which are analogous to invocation interface 145A and interfaces 140A, respectively, of component 104A.

To facilitate the security protocol described herein, each application and component can include an authorization interface. For example, application 102 includes authorization interface 129 which specifies the manner in which another program module can request authentication of application 102. Components 104A-B similarly include authorization interfaces 149A-B, respectively.

Application 102 also includes an authorization provider 128 which includes computer instructions and data which specify the behavior of application 102 when authentication is requested in accordance with authorization interface 129. Components 104A and 104B similarly include authorization providers 148A and 148B, respectively.

To authenticate a requesting program module, an adjunct program module can request a certificate of the requesting program module. In response, the authorization provider of the requesting program module supplies a certificate of the requesting program module. For example, application 102 includes a certificate 122, component 104A includes a certificate 142A, and component 104B includes a certificate 142B. While each certificate is shown to be included within each application or component, each certificate can alternatively be stored in memory 204 (FIG. 2) separately from the associated application or component of the certificate. For example, certificate 122 can be stored within memory 204 separately from application 102. Such facilitates replacement of expired certificates or replacement of a certificate with another, e.g., to change the permissions of the certificate.

Certificates are well-known and are described herein for completeness. However, full appreciation of certificates requires a basic understanding of asymmetric encryption which is also well-known and which is also described herein for completeness. The simplest of encryption techniques uses the same key for encryption and decryption. Encryption scrambles data from its original, native form to a scrambled, apparently undecipherable form. Decryption recovers the original data from the scrambled, apparently undecipherable form. Symmetric key encryption can be satisfactory for secure archival in which the person who is likely to want to decrypt the data is the same person who encrypted the data in the first place. However, when one party wishes to encrypt data for secure transport to another party, symmetric key encryption requires that the key is somehow transported as well, compromising security and/or representing a significant inconvenience.

Asymmetric key encryption uses pairs of reciprocal keys. The keys are reciprocal in that encryption by one key of the pair can only be undone by decrypting using the other key of the pair. Asymmetric key encryption is sometimes referred to as public key encryption because one key of a pair of reciprocal keys is held in strict secrecy and privacy while the other key of the pair is distributed publicly within the system of intended use of the public key. The system of intended use can be as large or larger than the Internet and can be as small as a single computer. Data can be encrypted for transport to a receiving party by encrypting the data using the public key of the receiving party. Thus, only the private key of the receiving party can decrypt the data.

Public key encryption also permits cryptographic signatures of data. To sign a collection of data, a party uses its private key to encrypt the data or, alternatively, to form a hash of the data such that the data is still available in cleartext form without verification of the signature. The data can be decrypted—or alternatively the hash can be verified—using the public key of that party. Since the public key is widely and publicly distributed within the system of intended use, the data is not secure when encrypted in this manner. However, successful decryption of the data using the party's public key verifies that it was encrypted by the party using its private key and therefore verifies the authenticity of the data as originating with the signing party. Such a cryptographic signature can be used to verify that noone has tampered with the data after the data was cryptographically signed.

One issue with verifying cryptographic signatures is verification that a particular public key belongs to a particular party. For example, a cryptographic signature from a trusted party is only as reliable as the certainty that the public key used to verify the signature is truly from the trusted party and not some imposter. A certificate binds a public key to a particular party. Generally, a certificate includes a public key and data identifying the owner of the public key. The certificate is signed by a trusted certificate authority which is typically an organization that is widely trusted to issue certificates. The cryptographic signature of the certificate authority ensures that noone has tampered with the certificate after its issuance.

Figure 3:
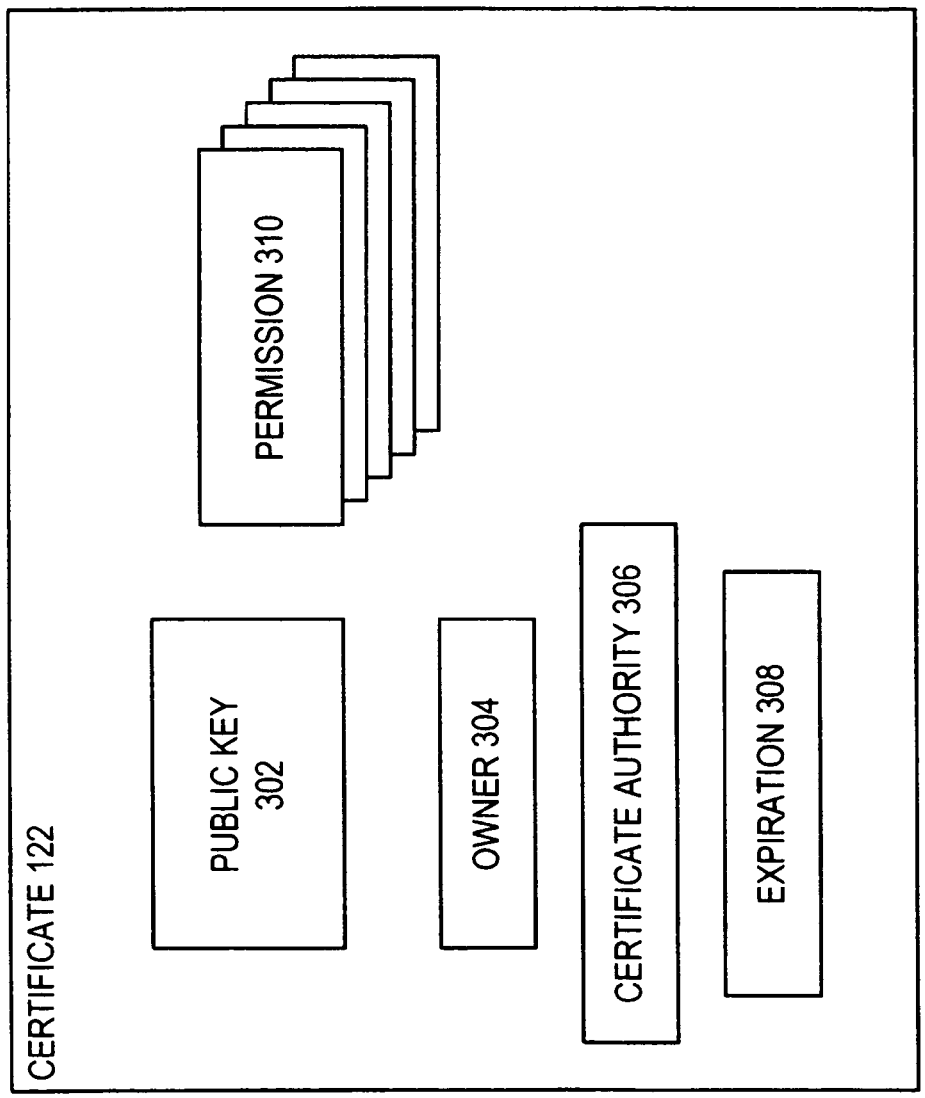
FIG. 3 is a block diagram of a certificate of FIG. 1 in greater detail.

Certificate 122 (FIG. 1) is shown in greater detail in FIG. 3 and is illustrative. Certificates 142A-B (FIG. 1) are analogous to certificate 122 and the following description of certificate 122 in the context of FIG. 3 is equally applicable to certificates 142A-B.

Certificate 122 (FIG. 3) includes a public key 302 and an owner field 304. Owner field 304 stores data identifying application 102 (FIG. 1) as the owner of certificate 122. Public key 302 (FIG. 3) is a public key of application 102 (FIG. 1). Certificate authority field 306 (FIG. 3) stores data identifying the certificate authority which issued certificate 122. Expiration field 308 stores data specifying a time after which certificate 122 is no longer valid.

Certificate 122 includes a number of permissions 310. Each of permissions 310 includes data specifying one or more types of actions which are permitted for the owner of certificate 122, e.g., application 102 (FIG. 1). Permissions 310 are used in a manner described more completely below to limit the types of actions adjunct program modules can perform at the request of application 102. Certificate 122 is cryptographically signed by the certificate authority to prevent tampering.

Logic flow diagrams 400A-B (FIG. 4) illustrate an adjunct program module interface with enhanced security in accordance with the present invention. Logic flow diagram 400A illustrates processing by a requesting application or a requesting adjunct program module, and logic flow diagram 400B illustrates processing by an invoked adjunct program module. In particular, an invoked adjunct program module, e.g., component 104B, includes an authorization verifier, e.g., authorization verifier 147B, which verifies authority of the requesting program module prior to performing the requested processing. In the context of logic flow diagrams 400A-B, the requesting application or adjunct program module is sometimes referred to as the requester. In the illustrative example of FIG. 1, the requester can be application 102 and the invoked adjunct program module can be component 104A. Alternatively, the requester can be component 104A and the invoked adjunct program module can be component 104B.

In step 402 (FIG. 4), the requester invokes the invoked adjunct program module in a conventional manner sending a number of parameters and an authorization interface. The parameters required by the invoked adjunct program module are specified by the invocation interface of the invoked adjunct program module. In this illustrative example, component 104B (FIG. 1) is the invoked adjunct program module and invocation interface 145B specifies the parameters required for proper execution of substantive computer code 144B. Each such required parameter is data to be supplied by the requester, e.g., component 104A in this illustrative example.

The required parameters can include the authorization interface of the requester, e.g., authorization interface 149A. The required parameters can also, or alternatively, require an authorization interface of a requester of the requester. In this illustrative example, invocation interface 145B can require the authorization interface of application 102, e.g., authorization interface 129, in lieu of or in addition to the authorization interface of the requester, e.g., authorization interface 149A of component 104A.

In step 452, component 104B (FIG. 1) receives the parameters and authorization interface. In step 454, authorization verifier 147B (FIG. 1) of component 104B requests and receives the certificate of the requester, e.g., certificate 142A, using the received authorization interface. In step 404, the authorization provider of the requester, e.g., authorization provider 148A, receives the request for the certificate and sends the certificate.

Figure 4A:
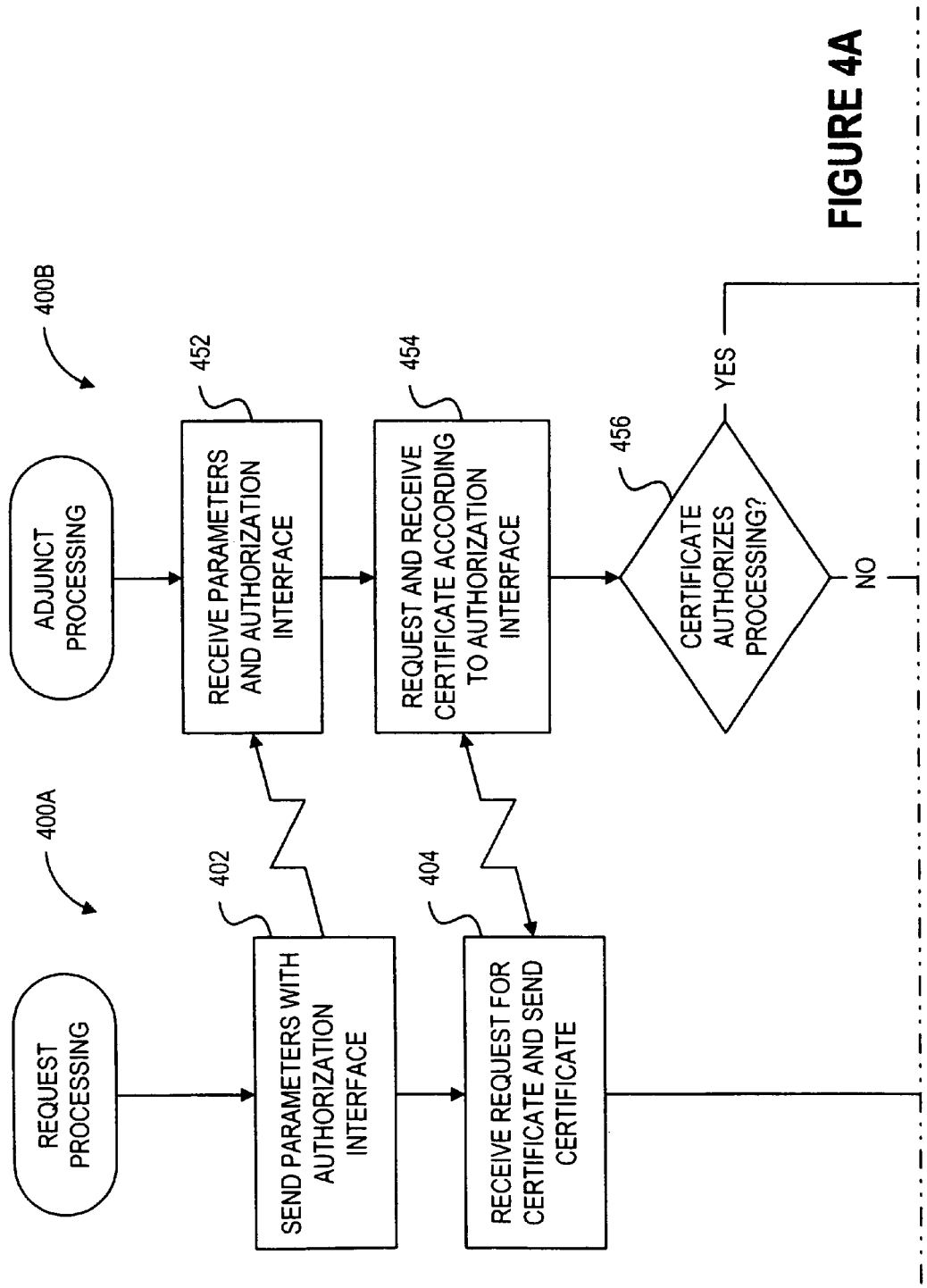
FIG. 4 is a logic flow diagram of a secure adjunct program interface in accordance with the present invention.

In test step 456 (FIG. 4), authorization verifier 147B (FIG. 1) determines whether the certificate authorizes processing in a manner described more completely below. If so, component 104B proceeds with processing according to substantive computer code 144B in step 458 (FIG. 4). Conversely, if the certificate does not authorize processing, component 104B produces an error message as the results of processing in step 460. In step 462, component 104B sends the results, either from step 458 or from step 460, to the requester. In step 406, the requester receives the results from the invoked adjunct program module.

Figure 5A:
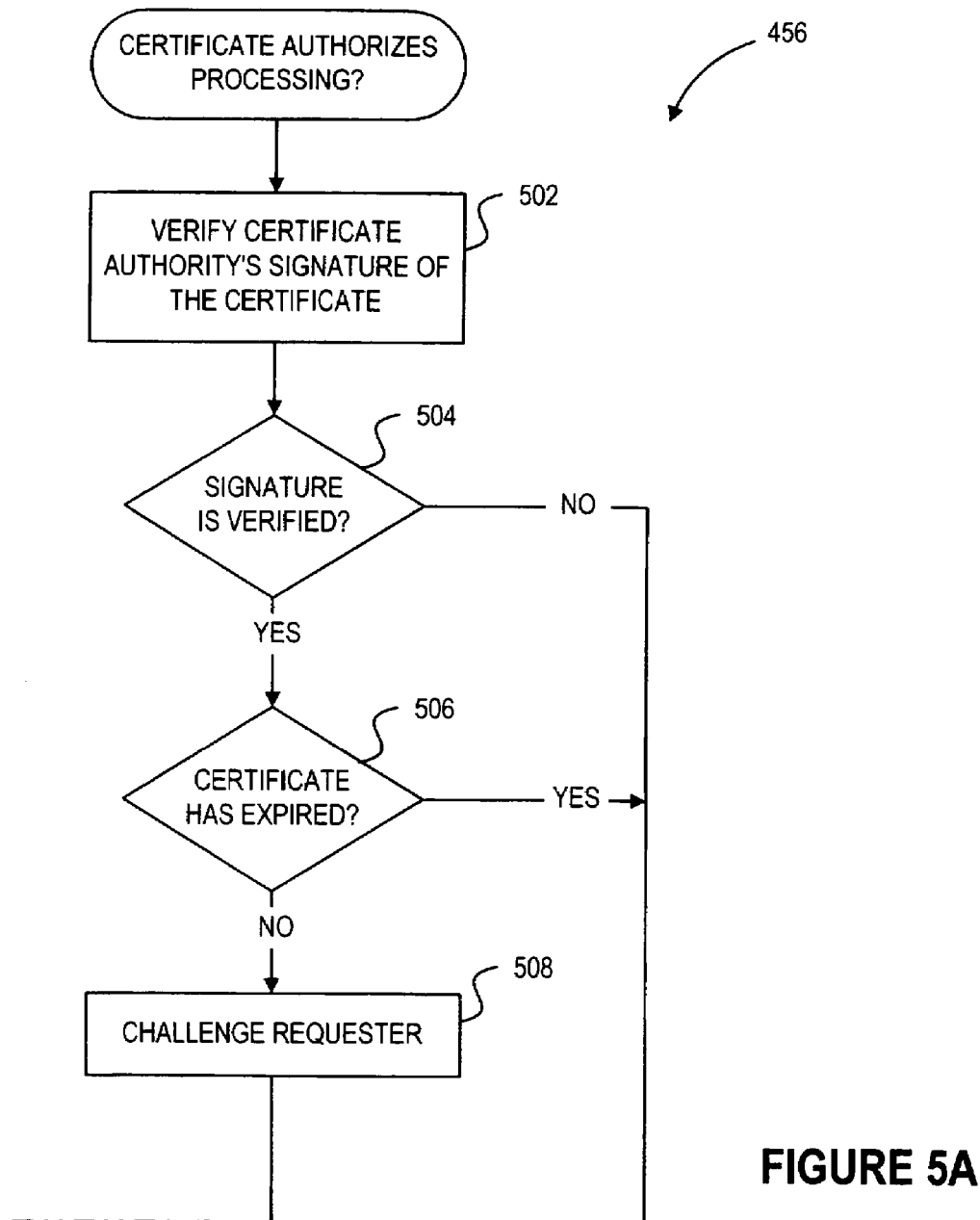
FIG. 5 is a logic flow diagram of the certificate verification of FIG. 4 in greater detail.

As described above, authorization verifier 147B verifies that the received certificate authorizes processing in test step 456. Test step 456 is shown in greater detail as logic flow diagram 456 (FIG. 5). In step 502, authorization verifier 147B (FIG. 1) verifies the signature of the certificate authority of the received certificate. In this illustrative example, the certificate received by authorization verifier 147B in step 454 (FIG. 4) is certificate 122 (FIGS. 1 and 3). In other examples, the received certificate can be certificate 142A (FIG. 1) or another certificate.

The certificate authority of certificate 122 (FIG. 3) is identified by certificate authority field 306. To verify the signature of certificate 122, authorization verifier 147B (FIG. 1) uses a certificate authority public key 141B. Since the public key is widely and publicly distributed within the system of intended use, application 102 and components 104A-B all include copies of the public key of the certificate authority or otherwise have access to a copy. In test step 504 (FIG. 5), authorization verifier 147B determines whether the signature of the certificate authority is verified. If so, processing transfers to test step 506.

In test step 506, authorization verifier 147B (FIG. 1) determines whether certificate 122 has expired by reference to a date and time represented by expiration field 308 (FIG. 3). If the certificate has not expired, processing transfers to step 508.

In step 508, authorization verifier 147B challenges the requester to verify the identity of the requester. As described above, the requester can have directly or indirectly requested processing by component 104B. The manner in which the requester is challenged and responds is described more completely below. In test step 510, authorization verifier 147B determines whether the requester responded properly to the challenge. If so, processing transfers to test step 512.

In test step 512, authorization verifier 147B determines whether the certificate in question includes one or more required permissions. In particular, component 104B performs processing only when a certificate grants the direct or indirect requester permission for such processing. Thus, component 104B is configured to perform requested processing only when a supplied certificate includes one or more requisite permissions. Accordingly, authorization verifier 147B of component 104B, in test step 512, searches permissions 310 (FIG. 3) for the one or more requisite permissions.

If all requisite permissions are found in the supplied certificate, processing transfers to terminal step 514 in which authorization verifier 147B of component 104B determines that the supplied certificate authorizes processing at the request of the requester. Conversely, if (i) one or more requisite permissions are not found in the supplied certificate (test step 512) or (ii) the requester responds improperly to the challenge (test step 510) or (iii) the supplied certificate has expired (test step 506) or (iv) the certificate's signature by the certificate authority is not verified (test step 504), processing transfers to terminal step 516 in which authorization verifier 147B of component 104B determines that the supplied certificate does not authorize processing at the request of the requester.

Thus, an attempt to request processing by component 104B from an unauthorized program module is prevented. Consider for example that component 104B decoded secure and copy-protected audio data for playback and produced therefrom uncompressed, cleartext, digital audio signals. Component 104B can require authentication of both component 104A as a direct requester and application 102 as an indirect requester. Any other module attempting to use component 104B to decode and decrypt such audio signals would have to produce a certificate identifying itself, having the proper permissions (test step 512), and signed by a certificate authority (test step 504). In addition, the imposter module would have to correctly respond to a challenge of the imposter's authority in steps 508-510. Each of these mechanisms provides security well beyond any security provided by conventional adjunct program modules.

The challenge-response authentication of steps 508-510 is shown more completely as logic flow diagram 508 (FIG. 6A) and processing by the requester in response to the challenge is illustrated by logic flow diagram 600. An alternative embodiment of step 508 is shown as logic flow diagram 508B (FIG. 6B) and is described more completely below.

Processing according to logic flow diagram 508 (FIG. 6A) begins with step 602 in which authorization verifier 147B of component 104B generates random or pseudo-random data. In step 604 (FIG. 6A), authorization verifier 147B (FIG. 1) sends the random data to the requester associated with the certificate in question. As described above, the requester can be a direct requester such as component 104A or an indirect requester such as application 102. In this illustrative example, the challenged requester is component 104A.

Figure 6A:
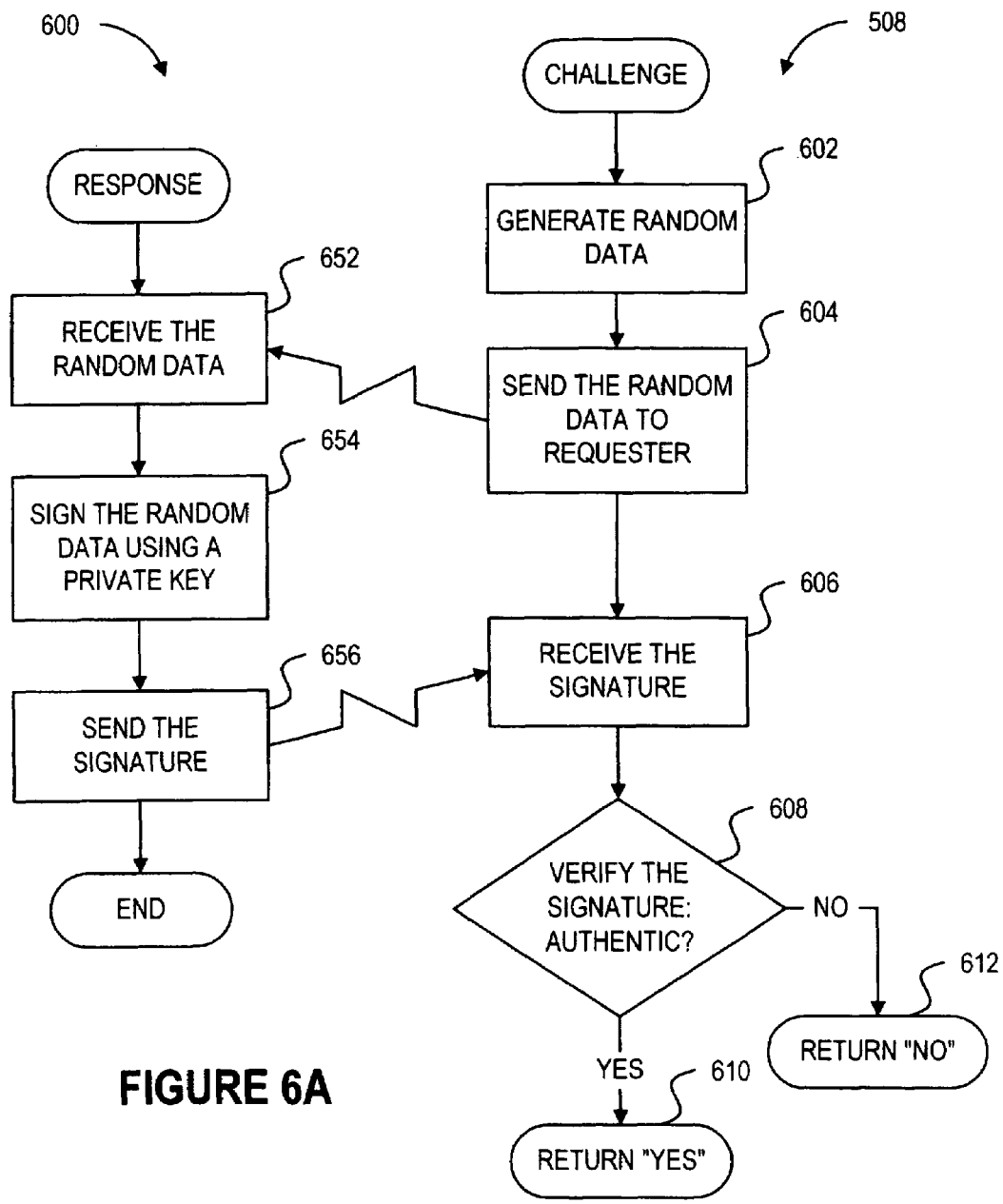

Component 104A includes challenge code 143A which includes computer instructions and data which collectively specify a behavior of authorization provider 148A of component 104A in response to a challenge such as that initiated by component 104B in step 604 (FIG. 6A). Processing in accordance with challenge code 143A is illustrated by logic flow diagram 600. In step 652, authorization provider 148A receives the random data. In step 654, authorization provider 148A cryptographically signs the random data using private key 146A (FIG. 1). Private key 146A is the reciprocal key to the public key included in certificate 142A. In step 656, authorization provider 148A sends the signed random data, or alternatively a hash signature of the random data, to component 104B as the response to the challenge.

In step 606, authorization verifier 147B receives the decrypted random data. In test step 608, authorization verifier 147B verifies the signature of the random data using the public key of the certificate in question. If the received signature is verified, authorization verifier 147B establishes that the requester responded properly to the challenge, thus proving that the requester has the private key associated with the supplied certificate. Conversely, if the received signature is not verified, authorization verifier 147B establishes that the requester did not respond properly to the challenge and therefore may not have the associated private key. Thus, as a precondition for processing as requested, component 104B can require both authentication in the form of a certificate and evidence that the requester has the associated private key in the requester's possession. Such represents a high level of security against unauthorized requests for processing by adjunct program modules.

An alternative challenge-response protocol is shown in logic flow diagrams 600B (FIG. 6B) and 508B in which processing begins with step 622. In step 622, authorization verifier 147B generates random or pseudo-random data. In step 624, authorization verifier 147B encrypts the random data using the public key of the certificate. In step 626, authorization verifier 147B (FIG. 1) sends the encrypted random data to the requester associated with the certificate in question.

In step 672, authorization provider 148A (FIG. 1) receives the encrypted random data. In step 674 (FIG. 6B), authorization provider 148A (FIG. 1) decrypts the encrypted random data using private key 146A. Successful decryption of the encrypted random data establishes possession of private key 146A and therefore establishes proper ownership of certificate 142A received by component 104B. In step 676 (FIG. 6B), authorization provider 148A (FIG. 1) sends the decrypted random data to component 104B as the response to the challenge.

In step 628 (FIG. 6B), authorization verifier 147B (FIG. 1) receives the decrypted random data. In test step 610, component 104B compares the received decrypted random data with the original random data. If the received decrypted random data matches the original random data, component 104B establishes that the requester responded properly to the challenge. Conversely, if the received decrypted random data is different from the original random data, component 104B establishes that the requester did not respond properly to the challenge.

A number of advantages are realized by interposing an authorization interface between the invoked adjunct program module and the requesting program module. One such advantage is a significant degree of flexibility in implementing the security protocol described herein. The following example is illustrative. Consider that application 102 invokes component 104B directly and that later component 104A is interposed between application 102 and component 104B. Such is possible with very little modification, if any, to application and component 104B. Component 104B can still require certificate 122 of application 102 and can require proper challenge-response from application 102.

Specifically, application 102 invokes component 104A and provides authorization interface 129. Component 104A subsequently invokes component 104B and provides authorization interface 149A. Without modification, authorization verifier 147B expects to receive certificate 122 of application 102 and preconditions proper response to a challenge by application 102 in the manner described above. Accordingly, authorization verifier 147B requests a certificate using authorization interface 149A.

Authorization provider 148A receives the request for a certificate. However, since component 104B is constructed with the knowledge that component 104B expects to interact directly with application 102, authorization provider 148A requests and receives certificate 122 from application 102 using authorization interface 129 and passes certificate 122 to authorization verifier 147B. Accordingly, authorization verifier 147B receives the expected certificate.

Similarly, authorization provider 148A can forward authority challenges from authorization verifier 147B to authorization provider 128 and can forward associated responses from authorization provider 128 to authorization verifier 147B and thus preserve the authentication verification between application 102 and component 104B.

The flexibility afforded by the use of authorization protocols enables countless other possibilities. For example, authorization provider 148A can require authority verification by authorization verifier 147A and authorization provider 128 as a prerequisite to providing a required certificate to authorization verifier 147B. In addition, authorization provider 148A can include multiple certificates, each with different permissions and can provide a specific one of the certificates depending upon various circumstances.

Another advantage of using authorization interfaces is that the behavior of an authorization provider can be subsequently modified without requiring modification of other elements of a particular program module.

Yet another advantage of using authorization interfaces is that authorization code can be supplied separately from the substantive computer code of a particular program module. For example, one entity can provide authorization provider 148A and authorization interface 149A as object code to be linked into component 104A by a second, separate entity. Thus, the first-mentioned entity can provide the public key infrastructure of authorization provider 148A without disclosing the specific details of the public key infrastructure, thus preserving the security provided by the public key infrastructure. Simultaneously, the second entity can construct authorization verifier 147A to request certificates and challenge authorization of requesting program modules using authorization interfaces of those program modules without requiring knowledge of the specific details of the public key infrastructure. Such allows the security protocol described herein without disclosing the specific details to those who use the security protocol.

The above description is illustrative only and is not limiting. Instead, the present invention is defined solely by the following claims.

What is claimed is:

1. A computer system comprising:
   a processor;
   a memory operatively coupled to the processor; and
   a processing authorization module (i) which executes in the processor from the memory and (ii) which, when executed by the processor, causes the computer to authorize requested processing by an adjunct program module by:
   receiving a request from a requesting module, wherein the requesting module received, the request from at least one prior requestor module, the request originating from an originating prior requestor module;
   requesting authorization from the requesting module, wherein authorization is then required from the at least one prior requestor module, including the originating prior requesting module;
   receiving authorization data in response to the requesting authorization;
   determining whether the authorization data authorizes processing in response to the request; and
   processing according to programming of the adjunct program module in response to the request upon a condition in which a certificate authorizes processing in response to the request,
   wherein an authorization provider of the requesting module includes multiple certificates, each having different permissions, and provides the certificate based upon authorization responses received from the at least one prior requestor module, including an originating prior requesting module.

2. The computer system of claim 1, wherein the at least one prior requestor module is not the originating prior requestor module.

3. The computer system of claim 1, wherein an authorization provider of the at least one prior requestor module requires authority verification by an authorization verifier of the originating prior requestor module as a prerequisite to the requesting module providing the authorization data in response to the requesting authorization.

4. A computer-readable medium having stored thereon computer-executable instructions for performing steps comprising:
   receiving a request from a requesting module, wherein the requesting module received the request from at least one prior requestor module, the request originating from an originating prior requestor module;
   requesting authorization from the requesting module, wherein authorization is then required from the at least one prior requestor module, including the originating prior requesting module;
   receiving authorization data in response to the requesting authorization;
   determining whether the authorization data authorizes processing in response to the request;
   receiving from an authorization provider of the requesting module a certificate, the authorization provider including multiple certificates, each having different permissions, the authorization provider providing the certificate based upon authorization responses received from the at least one prior requestor module, including an originating prior requesting module; and
   processing according to programming of an adjunct program module in response to the request upon a condition in which the certificate authorizes processing in response to the request.

5. The computer readable medium of claim 4, wherein, upon requesting authorization from the requesting module, the requesting module forwards authority challenges to the originating prior requestor module and forwards associated responses from the originating prior requestor module to the adjunct program module to preserve authentication verification between the originating prior requestor module and the adjunct program module.

6. The computer readable medium of claim 4, wherein an authorization provider of the at least one prior requestor module requires authority verification by an authorization verifier of the originating prior requestor module as a prerequisite to providing the authorization data.

7. The computer readable medium of claim 6, wherein an authorization provider of the originating prior requestor module forwards associated responses to an authorization verifier of the adjunct program module to preserve authentication verification between the originating prior requestor module and the adjunct program module.

8. The computer readable medium of claim 4, wherein determining comprises:
   determining that the authorization data includes data specifying one or more types of actions permitted by the authorization data, wherein one or more types of actions permitted include granting authority to examine parts of a secure, copy-protected audio signal; and
   determining that the one or more types of actions includes at least one type of action associated with processing to be performed in response to the request.

9. The computer readable medium of claim 8, wherein the parts of a secure, copy-protected audio signal include title and artist of the audio signal.

10. A method for authorizing requested processing by an adjunct program module, the method comprising:
    receiving a request from a requesting module, wherein the requesting module received the request from at least one prior requestor module, the request originating from an originating prior requestor module;
    requesting authorization from the requesting module, wherein authorization is then required from the at least one prior requestor module, including the originating prior requesting module;
    receiving authorization data in response to the requesting authorization;
    determining whether the authorization data authorizes processing in response to the request;
    receiving from an authorization provider of the requesting module a certificate, the authorization provider including multiple certificates, each having different permissions, the authorization provider providing the certificate based upon authorization responses received from the at least one prior requestor module, including an originating prior requesting module; and processing according to programming of the adjunct program module in response to the request upon a condition in which the certificate authorizes processing in response to the request.

11. The method of claim 10, wherein, upon requesting authorization from the requesting module, the requesting module forwards authority challenges to the originating prior requestor module and forwards associated responses from the originating prior requestor module to the adjunct program module to preserve authentication verification between the originating prior requestor module and the adjunct program module.

12. The method of claim 10, wherein an authorization provider of the at least one prior requestor module requires authority verification by an authorization verifier of the originating prior requestor module as a prerequisite to providing the authorization data.

13. The method of claim 12, wherein an authorization provider of the originating prior requestor module forwards associated responses to an authorization verifier of the adjunct program module to preserve authentication verification between the originating prior requestor module and the adjunct program module.

14. The method of claim 10, wherein determining comprises:
   determining that the authorization data includes data specifying one or more types of actions permitted by the authorization data, wherein one or more types of actions permitted include granting authority to examine parts of a secure, copy-protected audio signal; and
   determining that the one or more types of actions includes at least one type of action associated with processing to be performed in response to the request.

15. The method of claim 14, wherein the parts of a secure, copy-protected audio signal include title and artist of the audio signal.

* * * * *